United States Patent [19]
Machida et al.

[11] Patent Number: 5,979,397
[45] Date of Patent: Nov. 9, 1999

[54] CONTROL APPARATUS FOR DIRECT INJECTION SPARK IGNITION TYPE INTERNAL COMBUSTION ENGINE

[75] Inventors: Kenichi Machida; Junichi Furuya, both of Atsugi; Hiraku Ohba, Yokohama; Yuki Nakajima, Yokohama; Takamasa Ueda, Yokohama, all of Japan

[73] Assignee: Unisia Jecs Corporation, Kanagawa-ken, Japan

[21] Appl. No.: 09/106,762

[22] Filed: Jun. 30, 1998

[30] Foreign Application Priority Data

Jun. 30, 1997 [JP] Japan .................................. 9-173944

[51] Int. Cl.$^6$ ............................ F02B 17/00; F02D 41/30
[52] U.S. Cl. ........................................... 123/295; 123/299
[58] Field of Search .................................... 123/295, 299, 123/300

[56] References Cited

U.S. PATENT DOCUMENTS

| | | | |
|---|---|---|---|
| 4,955,339 | 9/1990 | Sasaki et al. | 123/295 |
| 5,078,107 | 1/1992 | Morikawa | 123/295 |

FOREIGN PATENT DOCUMENTS 59-37236  2/1984  Japan .

Primary Examiner—Andrew M. Dolinar
Attorney, Agent, or Firm—McDermott, Will & Emery

[57] ABSTRACT

The present invention aims at preventing such a situation that anyone of the divided injection amounts becomes less than a minimum compensation amount for a fuel injection valve, in case of conducting a two-step injection (weakly stratified combustion) in which a part of fuel is injected during intake stroke and the remaining fuel is injected during compression stroke. To this end, at the time of instructing to conduct the two-step injection, a whole injection amount TI is divided into: an injection amount TIH for homogeneous combustion to be injected during intake stroke, and an injection amount TIS for stratified combustion to be injected during compression stroke, based on a division ratio corresponding to a target air-fuel ratio. Further, each of the injection amounts TIH and TIS after division is compared with a minimum compensation amount MIN for the fuel injection valve. Based on the result of the comparison, the injection amount, which has a smaller division ratio, is set to be zero, and the injection amount, which has a larger division ratio, is set to be the whole injection amount TI, when either one of the injection amounts TIH and TIS is judged to be less than the minimum compensation amount MIN. Alternatively, the injection amount, which has the smaller division ratio, is set to be the minimum compensation amount MIN, and the injection amount, which has the larger division ratio, is set to be the remainder obtained by subtracting the minimum compensation amount MIN from the whole injection amount TI.

7 Claims, 6 Drawing Sheets

CONTROL APPARATUS FOR DIRECT INJECTION SPARK IGNITION TYPE INTERNAL COMBUSTION ENGINE

TECHNICAL FIELD

The present invention relates to a control apparatus for a direct injection spark ignition type internal combustion engine, and particularly to a control apparatus for a direct injection spark ignition type internal combustion engine in which a combustion mode is switchingly controlled between homogeneous combustion and stratified combustion.

BACKGROUND ART

Recently, attention has been directed to a direct injection spark ignition type internal combustion engine, in which it is common to switchingly control the combustion mode corresponding to an engine driving condition, i.e., to switchingly control the combustion mode between: homogeneous combustion in which fuel is injected during intake stroke so that the same is diffused within a combustion chamber thereby forming a homogeneous air-fuel mixture; and stratified combustion in which fuel is injected during compression stroke so that a stratified air-fuel mixture is formed concentratedly about an ignition plug (see Japanese Unexamined Patent Publication No. 59-37236).

In such a switching control, it has been contemplated to provide a weakly stratified combustion region at a boundary region spanning between a homogeneous combustion region and a stratified combustion region in each of all the performance maps having an engine rotation speed and its torque as map parameters. In such a weakly stratified combustion region, there is conducted a two-step injection in which a part of fuel is injected during intake stroke and the remaining fuel is injected during compression stroke, so as to prevent such as: misfire and smoke-increase due to an over-rich state in the stratified combustion; and misfire and unstable combustion due to an over-lean state in the homogeneous combustion.

However, compared with a one-step injection (normal injection), the amount of fuel to be injected to the engine is divided in the two-step injection, so that the injection amount (injection pulse width) at one time in the two-step injection becomes smaller than that of the one-step injection.

As such, each of the divided injection amounts may become less than a minimum compensation amount (minimum compensation pulse width; a lowermost value which can compensate linearity in pulse width-flow rate characteristics of a fuel injection valve), so that the fuel injection valve can not realize the flow rate compensation, causing torque difference or smoking due to inclination toward lean or rich side.

The present invention has been carried out in view of the conventional problems as described above, and it is therefore an object of the present invention to control fuel injection amounts at the time of two-step injection, to thereby restrain occurrence of torque difference or smoking due to inclination toward lean or rich side, which would occur if either of fuel injection amounts was less than a minimum compensation amount.

DISCLOSURE OF THE INVENTION

Thus, the present invention provides a control apparatus for a direct injection spark ignition type internal combustion engine, including: a fuel injection valve for directly injecting fuel into a combustion chamber of the engine; and a combustion mode switching control device for switchingly control a combustion mode of the engine at least between homogeneous combustion in which fuel is injected during intake stroke and stratified combustion in which fuel is injected during compression stroke, corresponding to an engine driving condition, the apparatus comprising: a two-step injection instructing device for instructing, based on a predetermined engine driving condition, to conduct two-step injection in which a part of fuel is injected during intake stroke and the remaining fuel is injected during compression stroke, and an injection amount dividing device for dividing, at the time of instruction to conduct two-step injection, a fuel injection amount to the engine into an injection amount for homogeneous combustion which is to be injected during intake stroke and an injection amount for stratified combustion which is to be injected during compression stroke, at a division ratio corresponding to a target air-fuel ratio at that time.

Further, the apparatus further comprises: a comparison device for comparing each of the injection amounts after division with a minimum compensation amount for the fuel injection valve, respectively, and a divided injection amount adjusting device for adjusting the injection amounts such that one of the injection amounts, which is judged to be less than the minimum compensation amount for the fuel injection valve, is set to be zero or the minimum compensation amount.

Namely, at the time of instruction to conduct two-step injection, a fuel injection amount to the engine is divided into an injection amount for homogeneous combustion which is to be injected during intake stroke, and an injection amount for stratified combustion which is to be injected during compression stroke, at a division ratio corresponding to a target air-fuel ratio at that time. Further, the injection amounts are compared with a minimum compensation amount for the fuel injection valve, respectively, and as comparison results, the injection amounts are adjusted such that one of the injection amounts, which is judged to be less than the minimum compensation amount for the fuel injection valve, is set to be zero or the minimum compensation amount. Thus, there is restrained occurrence of torque difference or smoking due to inclination toward lean or rich side, which would occur if either of fuel injection amounts was less than the minimum compensation amount.

In the above, the divided injection amount adjusting device is adapted to set the injection amount, which has a smaller division ratio, to be zero, and the injection amount, which has a larger division ratio, to be a whole injection amount, when either one of the injection amounts is judged to be less than the minimum compensation amount, to thereby conduct a one-step injection. Thus, there can be realized a required injection amount, without any excess and deficiency.

The divided injection amount adjusting device may be adapted to set the injection amount, which has a smaller division ratio, to be the minimum compensation amount, and the injection amount, which has a larger division ratio, to be the remainder obtained by subtracting the minimum compensation amount from the whole injection amount, when either one of the injection amounts is judged to be less than the minimum compensation amount. Also in this case, there can be realized a required injection amount, without any excess and deficiency.

The divided injection amount adjusting device is adapted to set each of the injection amounts to be the minimum compensation amount, respectively, when both of the injection amounts are judged to be less than the minimum compensation amount, respectively. Thus, there can be avoided at least such a situation that the injection amount control is disabled or lost.

The divided injection amount adjusting device is adapted to set the injection amount, which has a smaller division ratio, to be zero, and the injection amount, which has a larger division ratio, to be a whole injection amount, when both of the injection amounts are judged to be less than the minimum compensation amount, respectively, to thereby conduct a one-step injection. Thus, there can be realized a required injection amount, without any excess and deficiency.

The two-step injection instructing device is preferably adapted to instruct to conduct the two-step injection, in a boundary region spanning between a homogeneous combustion region and a stratified combustion region. Thus, the homogeneous combustion and the stratified combustion can be shifted from one to the other, with a smooth transition.

The injection amount dividing device is preferably adapted to set the division ratio, such that the leaner the target air-fuel ratio is, the larger the injection amount for stratified combustion which is to be injected during compression stroke is. Thus, the homogeneous combustion and the stratified combustion can be shifted from one to the other, with a smooth transition.

Further features and constitution, as well as operation and effects based thereon according to the present invention will become more apparent from the following description of preferred embodiments when read in conjunction with the accompanying drawings.

BEST MODE FOR CARRYING OUT THE INVENTION

Figure 1:
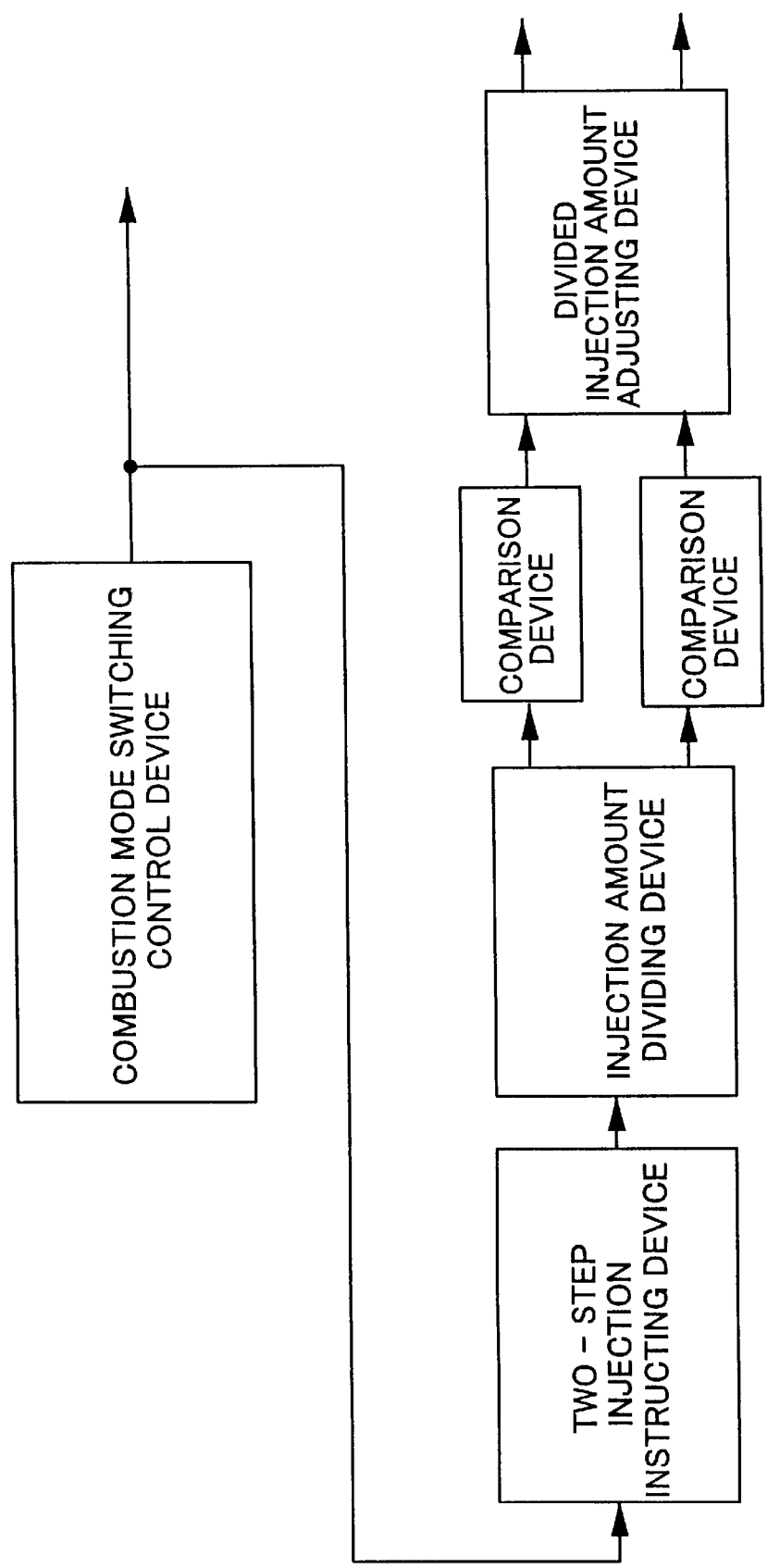
FIG. 1 is a functional block diagram showing a basic constitution of the present invention.

Shown in FIG. 1 is a basic constitution of a control apparatus for a direct injection spark ignition type internal combustion engine according to the present invention, and there will be hereinafter described the embodiments thereof with reference to FIGS. 2 through 7.

Figure 2:
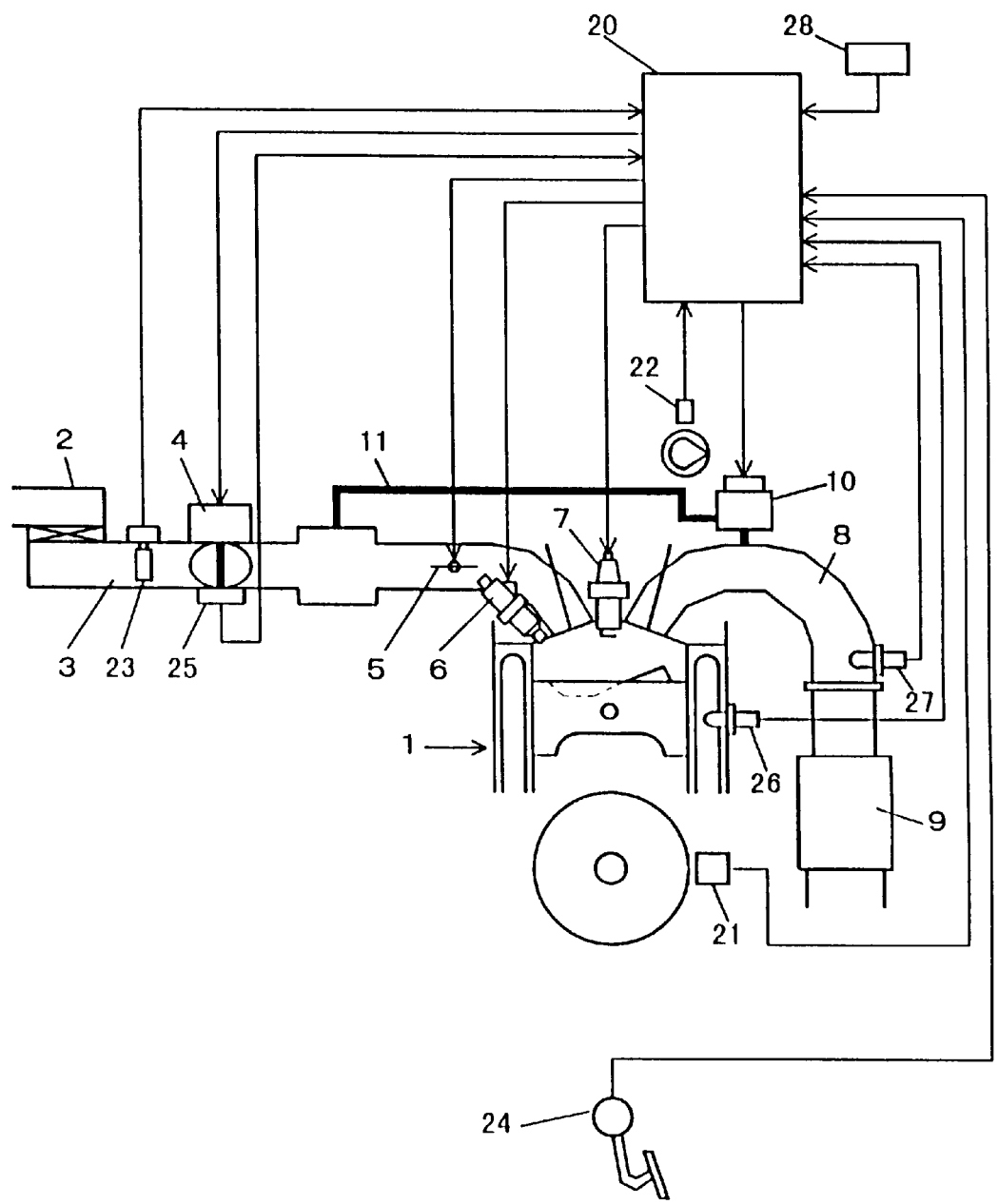
FIG. 2 is a systematic view of an internal combustion engine according to an embodiment of the present invention.

FIG. 2 is a systematic view of an internal combustion engine showing one embodiment of the present invention, which will be described first hereinafter.

Air is sucked into a combustion chamber of each of the cylinders of an internal combustion engine 1 from an air cleaner 2 via an intake passage 3, under control of an electrically controlled throttle valve 4. There is also provided a swirl control valve 5, so as to control air flow to be sucked into the combustion chamber, by controlling a cross sectional area of port.

Also provided is an electromagnetic injection valve (injector) 6 for directly injecting fuel (gasoline) into the combustion chamber.

To inject fuel which is regulated to a predetermined pressure, the electromagnetic injection valve 6 is constituted to be opened by means of a solenoid which is energized by an injection pulse signal which is output by a control unit 20 to be described later at intake stroke or compression stroke in a manner synchronized with engine rotation. The injected fuel is diffused within the combustion chamber to thereby establish a homogeneous air-fuel mixture, in case of intake stroke injection; and in case of compression stroke injection, form a stratified air-fuel mixture concentratedly about an ignition plug 7, and ignited by the plug 7 to be thereby burnt, based on an ignition signal from the control unit 20 to be described later. In the above, the combustion modes may be categorized into homogeneous stoichiometric combustion, homogeneous lean combustion (air-fuel ratio: from 20 to 30), and stratified lean combustion (air-fuel ratio: approximately 40), in combination with air-fuel ratio control.

An exhaust gas from the internal combustion engine 1 is exhausted via an exhaust passage 8 which is provided with a catalytic converter 9 thereon for purifying the exhaust gas. A part of the exhaust gas is recirculated toward the downstream of the electrically controlled throttle valve 4 of the intake passage 3 (intake manifold), via an electrically controlled exhaust gas recirculation valve 10 and thereafter through an exhaust gas recirculation passage 11.

The control unit 20 is provided with a microcomputer which is constituted to include CPU, ROM, RAM, A/D converter, and I/O interface. This unit 20 receives input signals from various sensors, and performs calculation based thereon, to thereby control operations such as of electromagnetic injection valve 6 and ignition plug 7.

The various sensors mentioned above include crank angle sensors 21 and 22 for detecting rotation of a crankshaft and a camshaft of the internal combustion engine 1, respectively. Each of these crank angle sensors 21 and 22 is adapted to generate: a reference pulse signal REF at a previously set crank angle position (such as 110° before top dead center), at each of crank angle 720°/n, assuming the number of cylinders be "n"; and a unit pulse signal POS for each unit angle of from 1° to 2°; so that an engine rotation speed Ne can be calculated such as based on a rotational period of the reference pulse signal REF. Particularly, the crank angle sensor 22 generates cylinder discrimination signals PHASE each of which corresponds to a specific cylinder, at previously set crank angles spanned by a crank angle of 720°, respectively, so that cylinder discrimination can be attained.

There are additionally provided such as an air flow meter 23 for detecting an intake air flow quantity Qa, at the upstream of the electrically controlled throttle valve 4 of the intake passage 3, an acceleration sensor 24 for detecting a stepped-forward degree of accelerator pedal (opening degree of accelerator) ACC, a throttle sensor 25 for detecting a throttle opening degree TVO of the electrically controlled throttle valve 4 (the throttle sensor 25 including an idle switch which is turned ON at a fully closed position of the throttle valve 4), a water temperature sensor 26 for detecting a temperature Tw of cooling water for the internal combustion engine 1, an oxygen sensor 27 for outputting a signal corresponding to a rich/lean state of an air-fuel ratio of exhaust gas within the exhaust passage 8, and a vehicle speed sensor 28 for detecting a vehicular speed VSP.

There will be described hereinafter the switching control of the combustion mode which is executed by the control unit 20, with reference to the flowchart of FIG. 3.

Figure 3:
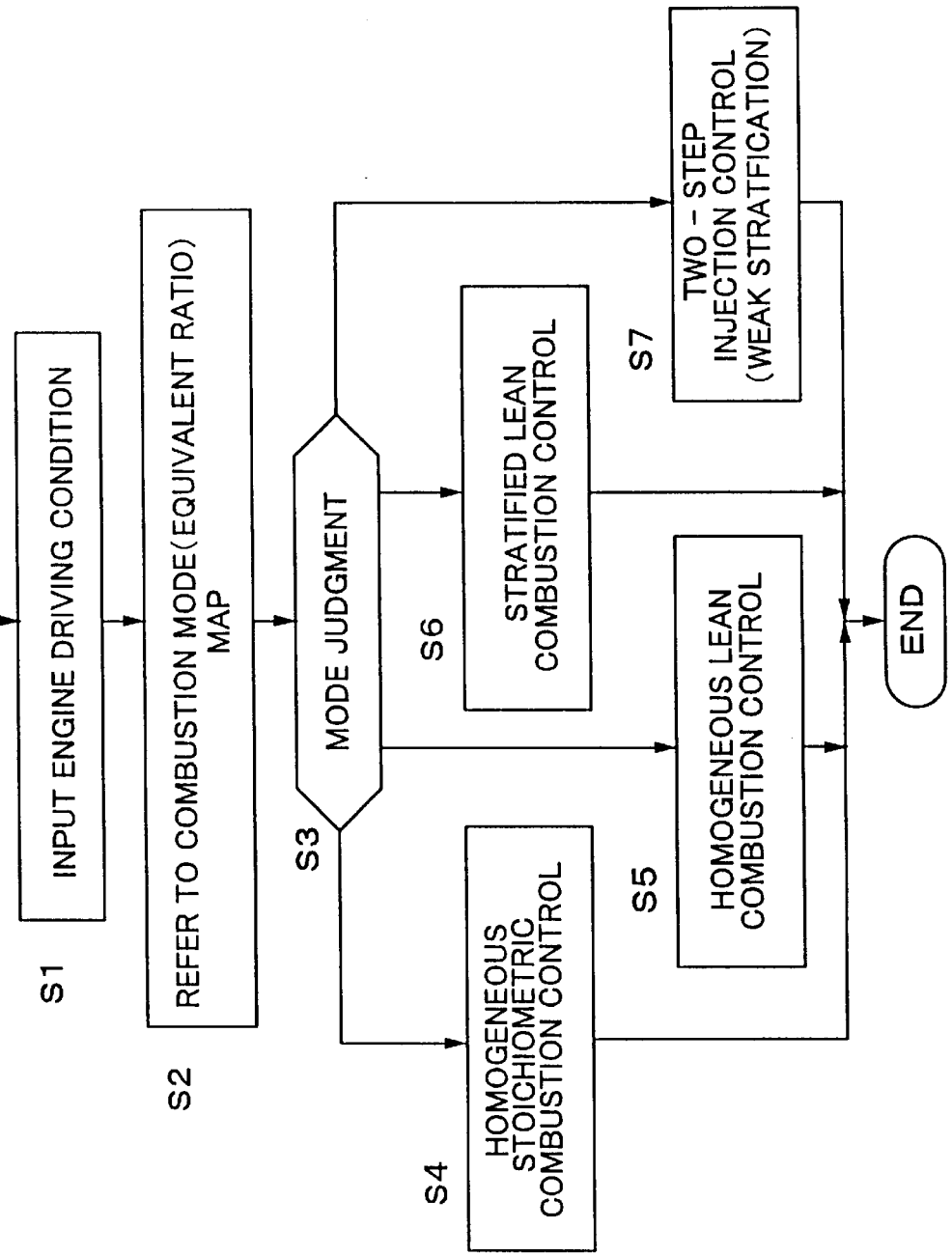
FIG. 3 is a flowchart of a routine for switching a combustion mode.

FIG. 3 shows a routine for switching a combustion mode, which routine is executed at intervals of a predetermined period of time (such as 10 ms). This routine corresponds to combustion mode switching control device.

At step 1 (referred to as S1; and the same rule applies correspondingly to the following), engine driving conditions such as engine rotation speed Ne, target engine-torque tTe, and cooling water temperature Tw are read in. Further, there is determined a target engine-torque tTe: in consideration of speed change ratio and torque ratio, based on a target driving force tTd which is set by the opening degree ACC of accelerator and the vehicular speed VSP; or based on the opening degree ACC of accelerator and the engine rotation speed Ne.

Figure 4:
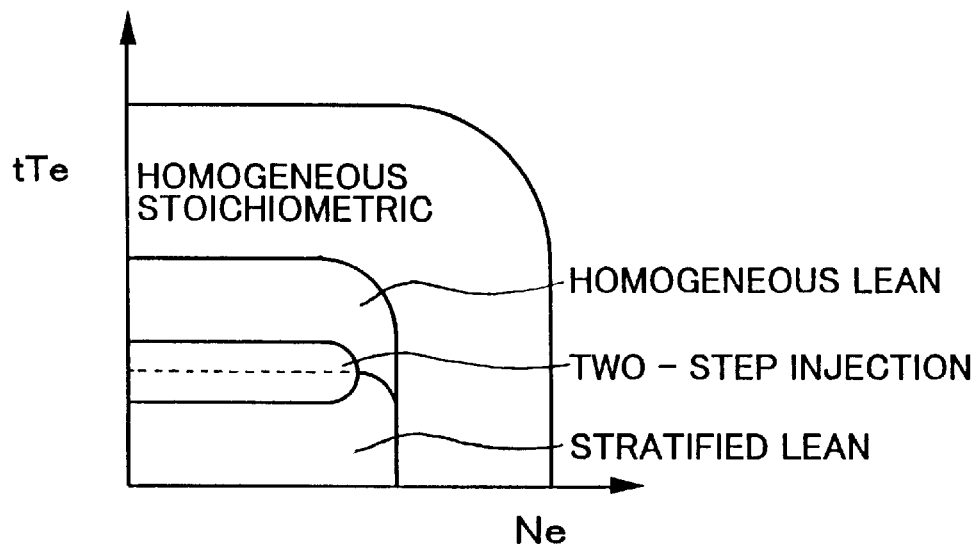
FIG. 4 is a schematic diagram of a combustion mode switching map.

At step 2, there is referred to a combustion mode switching map, based on the engine driving condition. Namely, as shown in FIG. 4, there are provided a plurality of maps each of which determines the combustion modes (as well as basic target equivalent ratio TFBYA0) based on parameters of engine rotation speed Ne and target engine-torque tTe, classified by conditions such as cooling water temperature Tw, and a period of time lapsed after engine starting. Determined from the map selected based on these conditions, is an appropriate one of the combustion modes (together with the basic target equivalent ratio TFBYA0) including homogeneous stoichiometric combustion, homogeneous lean combustion, stratified lean combustion, and two-step injection (weakly stratified combustion) in accordance with the parameters of the actual engine driving condition. The map exemplarily shown in FIG. 4 is provided for a condition after completion of warming up (cooling water temperature Tw is high, and the period of time after starting is sufficiently long).

At step 3, there is executed a judgment for the combustion mode, and the flow branches therefrom based on the judgment.

In case of homogeneous stoichiometric combustion, the flow goes to step 4, to conduct a due control. Namely, the amount of fuel injection is set to correspond to a stoichiometric air-fuel ratio (14.6), and there is executed an air-fuel ratio feedback control by the oxygen sensor 27, while the injection timing is set to be the intake stroke, to thereby perform the homogeneous stoichiometric combustion.

In case of homogeneous lean combustion, the flow goes to step 5, to conduct a due control. Namely, the amount of fuel injection is set to correspond to a lean air-fuel ratio of from 20 to 30, and there is executed an open control, while the injection timing is set to be the intake stroke, to thereby perform the homogeneous lean combustion.

In case of stratified lean combustion, the flow goes to step 6, to conduct a due control. Namely, the amount of fuel injection is set to correspond to a lean air-fuel ratio at approximately 40, and there is executed an open control, while the injection timing is set to be the compression stroke, to thereby perform the stratified lean combustion.

In case of two-step injection (weakly stratified combustion), the flow goes to step 7, to conduct a due control. Namely, there is executed a two-step injection, whereby a part of fuel is injected during intake stroke and the remaining fuel is injected during compression stroke, more particularly, the fuel injection amount is divided into the injection amount for homogeneous combustion, which is injected during intake stroke and the injection amount for stratified combustion, which is injected during compression stroke. Thus, this routine part corresponds to two-step injection instructing device.

Figure 5:
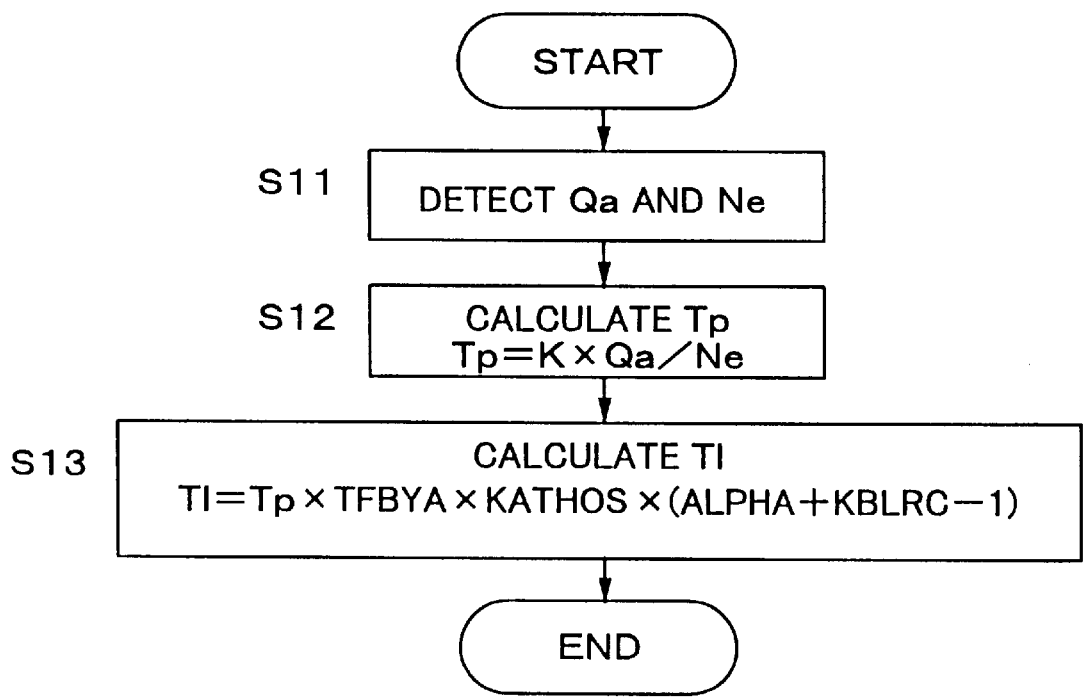
FIG. 5 is a flowchart of a routine for calculating a fuel injection amount.

FIG. 5 shows a routine for calculating the fuel injection amount (whole injection amount, in case of two-step injection), which routine is executed at intervals of a predetermined period of time, and the result thereof is referred to in the aforementioned homogeneous stoichiometric combustion control, homogeneous lean combustion control, stratified lean combustion control, and two-step injection control.

At step 11, there are detected such as intake air flow quantity Qa and engine rotation speed Ne.

At step 12, there is calculated a basic fuel injection amount Tp corresponding to the stoichiometric air-fuel ratio, by the following equation:

$$Tp = K \times Qa/Ne$$

wherein K is a constant.

At step 13, there is calculated a fuel injection amount TI, by the following equation:

$$TI = Tp \times TFBYA \times KATHOS \times (ALPHA + KBLRC - 1)$$

wherein TFBYA is a target equivalent ratio, which is obtained by such a processing that the basic target equivalent ratio TFBYA0 obtained from the selected map is corrected such as based on an combustion efficiency, and added with a time-lag for first order. The target equivalent ratio TFBYA is also called "target air-fuel ratio correction coefficient" which is represented as 14.6/tAF, assuming the target air-fuel ratio be tAF.

Further, KATHOS is a transient correction coefficient which is established such as based on a variation of the throttle opening degree TVO.

In addition, ALPHA is an air-fuel ratio feedback correction coefficient, based on the oxygen sensor signal, and is clamped at one (i.e., =1) at the lean combustion. KBLRC is a learning correction coefficient based on a control result of the air-fuel ratio feedback control.

Figure 6:
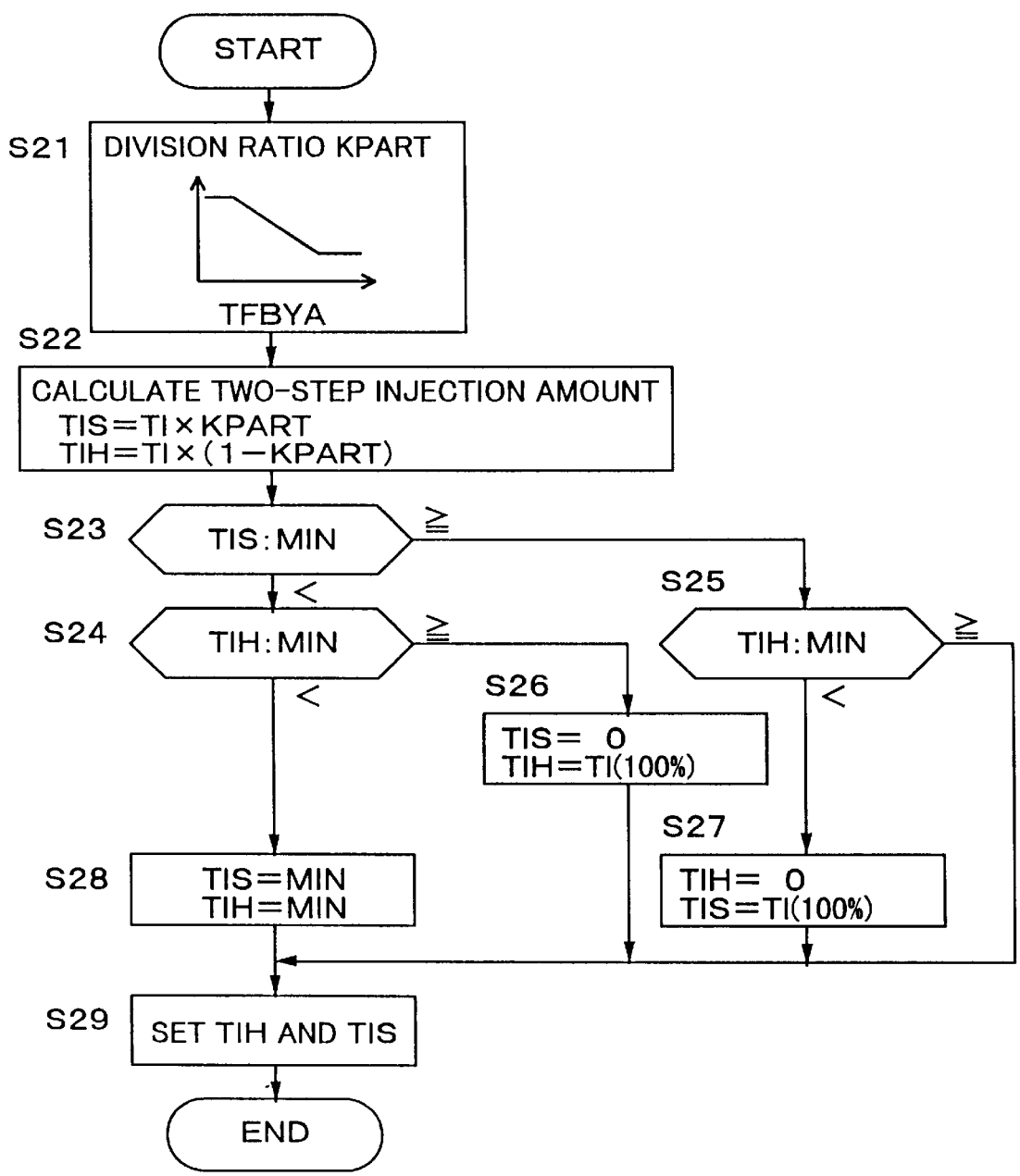
FIG. 6 is a flowchart of a routine for controlling a fuel injection amount, at the time of two-step injection.

FIG. 6 shows a routine for controlling the injection amount at the time of two-step injection, which routine is executed in case of the two-step injection control (step 7 of FIG. 3).

At step 21, there is referred to a table which is stored with a previously set division ratio KPART (here, ratio of the injection amount for the stratified combustion, to the whole injection amount) according to the target equivalent ratio TFBYA. Further, the division ratio KPART is established based on the actual target equivalent ratio TFBYA.

Here, the smaller the target equivalent ratio TFBYA is (i.e., the leaner the target air-fuel ratio is), the larger the division ratio KPART of the injection amount for the stratified combustion is. Further, the larger the target equivalent ratio TFBYA is to thereby approach 1 (i.e., the closer the target air-fuel ratio approaches stoichiometric), the smaller the division ratio KPART of the injection amount for the stratified combustion is.

At step 22, there is calculated the two-step injection amount, according to the division ratio. Namely, there is calculated an injection amount TIS for stratified combustion to be injected during compression stroke, by multiplying the fuel injection amount TI with a division ratio KPART by the following equation (1), while calculating an injection amount TIH for homogeneous combustion to be injected during intake stroke, by multiplying the fuel injection amount TI with the other division ratio (1-KPART):

$$TIS = TI \times KPART \quad (1)$$

and $$TIH = TI \times (1-KPART) \quad (2).$$

At step 23, the injection amount TIS for stratified combustion is compared with a minimum compensation amount MIN for the fuel injection valve, and the flow branches based on the result of the comparison. At each of the branchingly reached steps 24 and 25, the injection amount TIH for homogeneous combustion is compared with the minimum compensation amount MIN for the fuel injection valve.

Based on these results, in case that both of the injection amounts TIS and TIH are judged to be equal to or larger than the minimum compensation amount MIN (i.e., in case that TIS≧MIN, and TIH≧MIN), no adjustment is required, so that the injection amounts TIS and TIH divided at step 22 are maintained as they are. Then, the flow goes to step 29, so as to set the injection amount TIH for homogeneous combustion to be injected during intake stroke and the injection amount TIS for stratified combustion to be injected during compression stroke, into a predetermined register.

In case that either of the injection amounts, such as injection amount TIS for stratified combustion is less than the minimum compensation amount MIN (i.e., in case that TIS<MIN, and TIH≧MIN), the flow reaches step 26 to thereby set 0 (zero) for the injection amount TIS for stratified combustion which is the injection amount having the lesser division ratio, while setting the whole injection amount TI for the injection amount TIH for homogeneous combustion which is the injection amount having larger division ratio. In this case, there is conducted a one-step injection (i.e., only the injection during intake stroke, for the homogeneous combustion).

Conversely, in case that the injection amount TIH for homogeneous combustion is less than the minimum compensation amount MIN (i.e., in case that TIS≧MIN, and TIH<MIN), the flow reaches step 27 to thereby set 0 (zero) for the injection amount TIH for homogeneous combustion which is the injection amount having the lesser division ratio, while setting the whole injection amount TI for the injection amount TIS for stratified combustion which is the injection amount having larger division ratio. In this case, there is conducted a one-step injection (i.e., only the injection during compression stroke, for the stratified combustion).

Meanwhile, if it is judged that both of the injection amounts TIS and TIH are less than the minimum compensation amount MIN (i.e., in case that TIS<MIN and TIH<MIN), the flow reaches the step 28 so as to set both of the injection amounts TIS and TIH to be the minimum compensation amount MIN.

After either of these adjusting controls, the flow goes to step 29 so as to set the adjusted injection amount TIH for homogeneous combustion to be injected during intake stroke and the adjusted injection amount TIS for stratified combustion to be injected during compression stroke, into a predetermined register. Thereafter, this routine is terminated.

In the above, the processing parts of steps 21 and 22 correspond to injection amount dividing device; those of steps 23 through 25 correspond to comparison device; and those of steps 26 through 28 correspond to divided injection amount adjusting device.

There will be described hereinafter another embodiment of the present invention.

Figure 7:
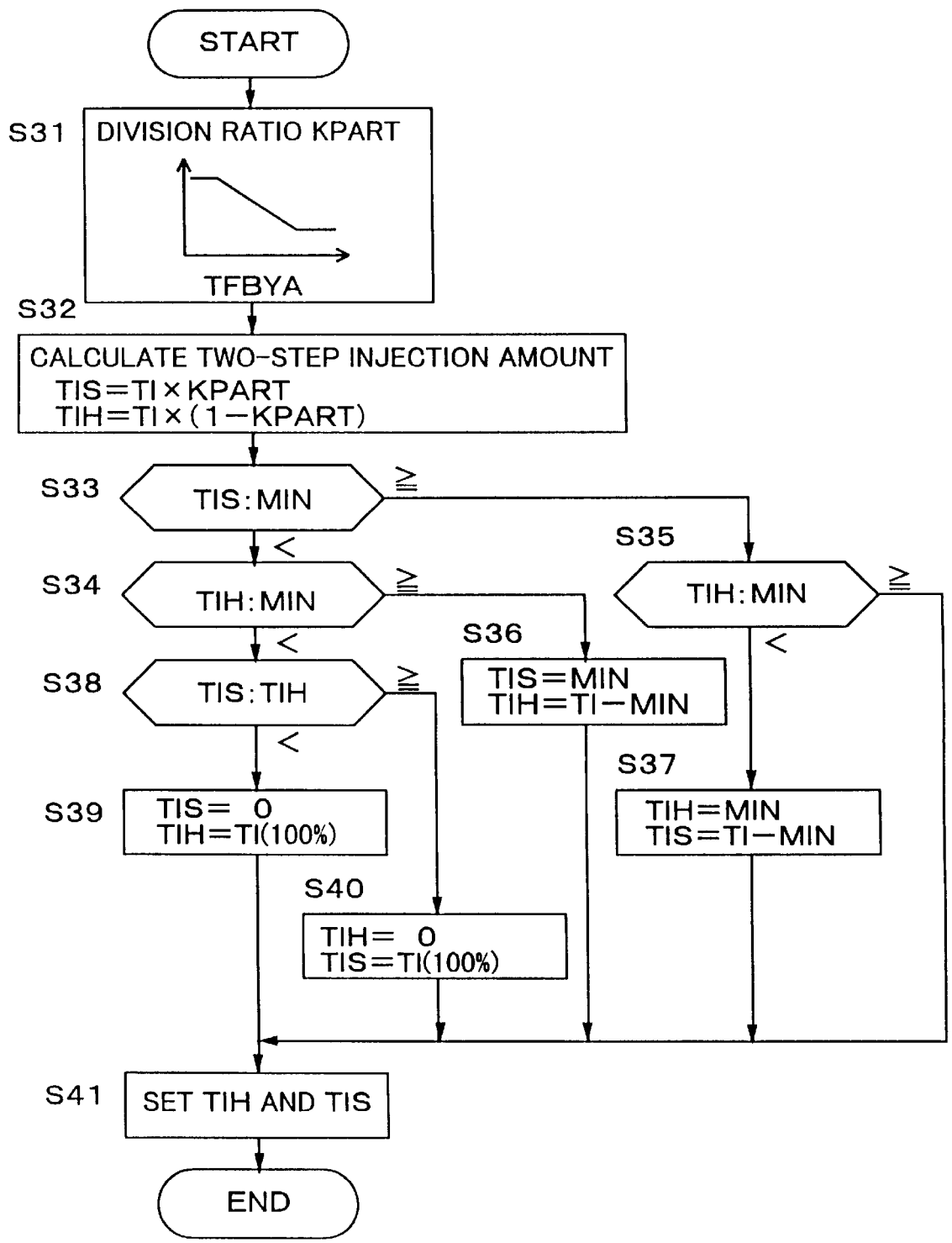
FIG. 7 is a flowchart of a routine for controlling a fuel injection amount at the time of two-step injection, according to another embodiment.

FIG. 7 shows a routine for controlling the injection amount at the time of two-step injection, which routine is executed instead of the routine shown in FIG. 6.

Those processings executed at steps 31 through 35 are identical with those at steps 21 through 25 of FIG. 6, so that the explanation thereof is omitted.

In case that either of the injection amounts, such as injection amount TIS for stratified combustion is less than the minimum compensation amount MIN (i.e., in case that TIS<MIN, and TIH≧MIN), the flow reaches step 36 to thereby set the minimum compensation amount MIN for the injection amount TIS for stratified combustion which is the injection amount having the lesser division ratio. Further, the remainder (TI-MIN), which is obtained by subtracting the minimum compensation amount MIN from the whole injection amount TI, is set for the injection amount TIH for homogeneous combustion which is the injection amount having larger division ratio.

Conversely, in case that the injection amount TIH for homogeneous combustion is less than the minimum compensation amount MIN (i.e., in case that TIS≧MIN, and TIH<MIN), the flow reaches step 37 to thereby set the minimum compensation amount MIN for the injection amount TIH for homogeneous combustion which is the injection amount having the lesser division ratio. Further, the remainder (TI-MIN), which is obtained by subtracting the minimum compensation amount MIN from the whole injection amount TI, is set for the injection amount TIS for stratified combustion which is the injection amount having larger division ratio.

Meanwhile, if it is judged that both of the injection amounts TIS and TIH are less than the minimum compensation amount MIN (i.e., in case that TIS<MIN and TIH<MIN), the flow reaches the step 38 so as to compare the magnitudes of the injection amount TIS for stratified combustion and the injection amount TIH for homogeneous combustion (i.e., the magnitudes of the division ratio KPART for the injection amount for stratified combustion and the division ratio 1-KPART for the injection amount for homogeneous combustion) with each other.

In case that TIS<TIH, the flow branches to step 39 to thereby set 0 (zero) for the injection amount TIS for stratified combustion which is the injection amount having the lesser division ratio, while setting the whole injection amount TI for the injection amount TIH for homogeneous combustion which is the injection amount having larger division ratio. In this case, there is conducted a one-step injection in which the injection is effected only during intake stroke, for the homogeneous combustion.

Conversely, in case that TIS≧TIH, the flow branches to step 40, to thereby set 0 (zero) for the injection amount TIH for homogeneous combustion which is the injection amount having the lesser division ratio, while setting the whole injection amount TI for the injection amount TIS for stratified combustion which is the injection amount having larger division ratio. In this case, there is conducted a one-step injection in which the injection is effected only during compression stroke, for the stratified combustion.

After either of these adjustments, the flow goes to step 41 so as to set the adjusted injection amount TIH for homogeneous combustion to be injected during intake stroke and the adjusted injection amount TIS for stratified combustion to be injected during compression stroke, into a predetermined register. Thereafter, this routine is terminated.

In the above, the processing parts of steps 31 and 32 correspond to injection amount dividing device; those of steps 33 through 35 correspond to comparison device; and those of steps 36 through 40 correspond to divided injection amount controlling device.

As a further embodiment, based on the flowchart of FIG. 6, the step 28 therein may be substituted by the steps 38 through 40 of the flowchart of FIG. 7, or based on the flowchart of FIG. 7, the steps 38 through 40 may be substituted by the step 28 of the flowchart of FIG. 6.

According to the present invention as described above, at the time of instructing to conduct the two-step injection, the amount of fuel to be injected to engine is divided, by the division ratio according to the then target air-fuel ratio at that time, into the injection amount for homogeneous combustion to be injected during intake stroke and the injection amount for stratified combustion to be injected during compression stroke. Further, each of the as-divided injection amounts is compared with the minimum compensation amount for the fuel injection valve. Based on the result of the comparison, each of the injection amounts is adjusted such that the injection amount or amounts, which is or are judged to be less than the minimum compensation amount, is or are set to be 0 (zero) or the minimum compensation amount. Thus, there can be obtained such an effect to restrain occurrence of torque difference or smoking due to inclination toward lean or rich side, which would occur if either of the fuel injection amounts was less than a minimum compensation amount, so that the industrial applicability of the present invention is quite large and promising.

What we claimed are:

1. A control apparatus for a direct injection spark ignition type internal combustion engine, including: a fuel injection valve for directly injecting fuel into a combustion chamber of the engine; and combustion mode switching control means for switchingly control a combustion mode of the engine at least between homogeneous combustion in which fuel is injected during intake stroke and stratified combustion in which fuel is injected during compression stroke, corresponding to an engine driving condition, said apparatus comprising:

two-step injection instructing means for instructing, based on a predetermined engine driving condition, to conduct two-step injection in which a part of fuel is injected during intake stroke and the remaining fuel is injected during compression stroke, and injection amount dividing means for dividing, at the time of instruction to conduct two-step injection, a fuel injection amount to the engine into an injection amount for homogeneous combustion which is to be injected during intake stroke and an injection amount for stratified combustion which is to be injected during compression stroke, at a division ratio corresponding to a then target air-fuel ratio at that time, and wherein said apparatus further comprises comparison means for comparing each of said injection amounts after division with a minimum compensation amount for the fuel injection valve, respectively, and divided injection amount adjusting means for adjusting said injection amounts such that one of said injection amounts, which is judged to be less than the minimum compensation amount for the fuel injection valve, is set to be zero or the minimum compensation amount.

2. A control apparatus for a direct injection spark ignition type internal combustion engine of claim 1, wherein
   said divided injection amount adjusting means is adapted to set the injection amount, which has a smaller division ratio, to be zero, and the injection amount, which has a larger division ratio, to be a whole injection amount, when either one of said injection amounts is judged to be less than the minimum compensation amount.

3. A control apparatus for a direct injection spark ignition type internal combustion engine of claim 1, wherein
   said divided injection amount adjusting means is adapted to set the injection amount, which has a smaller division ratio, to be the minimum compensation amount, and the injection amount, which has a larger division ratio, to be the remainder obtained by subtracting the minimum compensation amount from the whole injection amount, when either one of said injection amounts is judged to be less than the minimum compensation amount.

4. A control apparatus for a direct injection spark ignition type internal combustion engine of claim 1, wherein
   said divided injection amount adjusting means is adapted to set each of said injection amounts to be the minimum compensation amount, respectively, when both of said injection amounts are judged to be less than the minimum compensation amount, respectively.

5. A control apparatus for a direct injection spark ignition type internal combustion engine of claim 1, wherein
   said divided injection amount adjusting means is adapted to set the injection amount, which has a smaller division ratio, to be zero, and the injection amount, which has a larger division ratio, to be a whole injection amount, when both of said injection amounts are judged to be less than the minimum compensation amount, respectively.

6. A control apparatus for a direct injection spark ignition type internal combustion engine of claim 1, wherein
   said two-step injection instructing means is adapted to instruct to conduct said two-step injection, in a boundary region spanning between a homogeneous combustion region and a stratified combustion region.

7. A control apparatus for a direct injection spark ignition type internal combustion engine of claim 1, wherein
   said injection amount dividing means is adapted to set said division ratio, such that the leaner the target air-fuel ratio is, the larger said injection amount for stratified combustion which is to be injected during compression stroke is.

* * * * *